United States Patent

Cusick

[15] 3,654,019
[45] Apr. 4, 1972

[54] METHODS AND APPARATUS FOR BONDING LAMINATE MATERIALS

[72] Inventor: Gordon Edward Cusick, Dalebrook, Handforth Road, Wilmslow, Chesire, England

[22] Filed: Dec. 10, 1969

[21] Appl. No.: 883,734

[52] U.S. Cl. ............................... 156/285, 156/381, 156/382
[51] Int. Cl. .......................................................... B29c 17/00
[58] Field of Search ................................. 156/285, 381, 382

[56] References Cited

UNITED STATES PATENTS

| | | |
|---|---|---|
| 3,190,781 | 6/1965 | Metz, Jr. ............................ 156/285 X |
| 3,234,065 | 2/1966 | Best .................................... 156/285 X |
| 2,781,078 | 2/1957 | Dovidio ............................... 156/382 |
| 3,331,728 | 7/1967 | Lane .................................... 156/285 X |

Primary Examiner—Reuben Epstein
Assistant Examiner—S. R. Hellman
Attorney—Alexander T. Kardos and Robert L. Minier

[57] ABSTRACT

Methods and apparatus for adhering outer facing fabrics to fusible interlining backing fabrics by pressing such fabrics together by a suction or negative pressure created by a vacuum, and heating the fabrics while they are so pressed together to cause them to adhere to each other to form laminated materials.

5 Claims, 3 Drawing Figures

Patented April 4, 1972
3,654,019
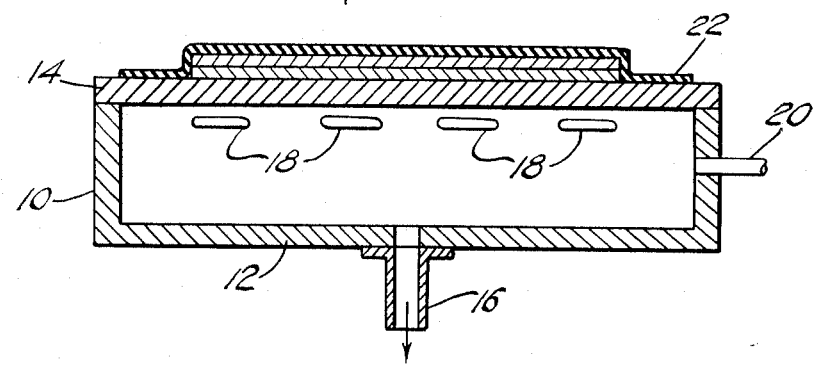
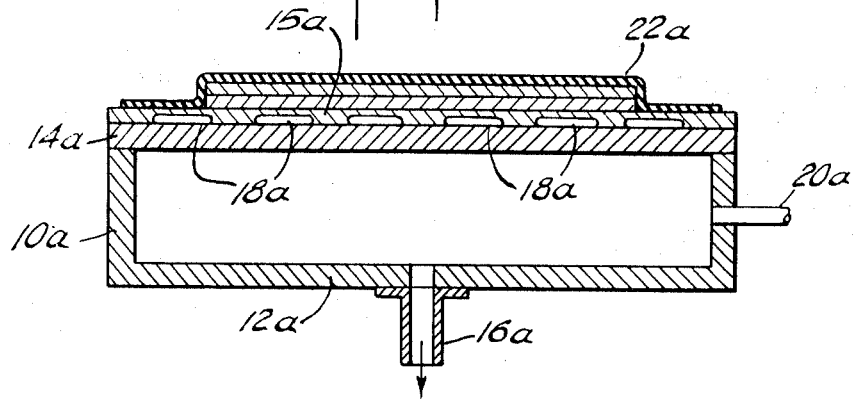
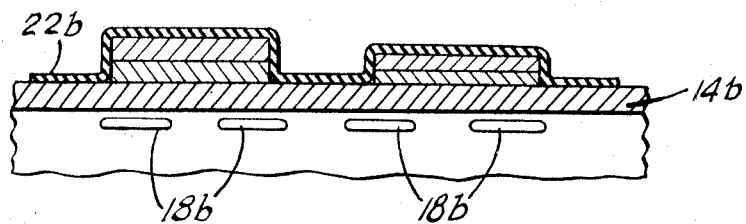
INVENTOR
GORDON EDWARD CUSICK
BY
Alexander T. Kardos
ATTORNEY

METHODS AND APPARATUS FOR BONDING LAMINATE MATERIALS

This invention relates to an improved method for the bonding or pressing of textile fabrics and an apparatus therefore.

It is well known to bond laminae of textile materials together by the use of a thermoplastic interlining which fuses on the application of heat and pressure to unite the laminae.

The object of the invention is to apply a suction or negative pressure to textiles or like materials in order to bond or press the materials.

The method according to the invention comprises applying a textile or like material to a platen, covering the materials on the platen with a substantially flexible non-porous sheet, applying suction or negative pressure to the platen and finally removing the sheet and material from the platen.

In carrying out the invention, which is applicable to textile woven fabrics, nonwoven fabrics, webs or foams, etc. or to two or more of these which are laid together, the material is laid out on a platen and covered with a flexible substantially non-porous sheet. Suction or negative pressure is applied to the platen. The pressure applied to the materials may be between zero and the pressure of the atmosphere. Where necessary the materials may be heated at the same time as they are pressed. This heat may be applied by conduction or by convection, radiation, hot air, dielectric heating or laser beams, etc. through the platen or a pressing head. Live steam may be applied to the materials before or after pressing.

The invention may be employed for bonding together two or more layers, having an adhesive between the materials in the form of a liquid, gel or solid (sheet, net, web powder, granular, etc.) or it may be applied to one of the layers as a fusible interlining. Alternatively, the materials may be themselves of thermoplastic nature. The adhesive may be activated by heat as is usual in the case with fusible interlinings. The pressure supplied by the apparatus may be used to increase the glue-line temperature by pressing the materials against a hot platen.

Single or multilayers of material may be treated by pressure and heat in order to (a) press to remove creases, (b) or to activate thermoplastic or thermosetting resins which have been previously applied to the fabrics or garment parts.

Single or multilayers of material may be formed into two or three dimensional shapes with the use of pressure and heat applied by this method. In this case a curved platen or rigid curved shape is employed.

An apparatus for carrying out the method consists of a vessel, part of which is a platen with holes such as perforated metal, sintered metal, woven metal or metal sheet drilled with holes. The remainder of the vessel is closed and a connection is made to a vacuum or partial vacuum line or pump and to a steam supply so that live steam if required may be blown through the platen, and for heating the platen. Alternatively, the platen may be heated electrically or from other sources of heat energy.

Such apparatus and the methods relating to the use of the same will be understood more clearly by reference to the accompanying drawings wherein:

FIG. 1 is a simplified, schematic cross-sectional view of apparatus suitable for carrying out the principles of the present invention;

FIG. 2 is a simplified, schematic cross-sectional view of a modification of the apparatus illustrated in FIG. 1; and FIG. 3 is a fragmentary, simplified, schematic cross-sectional view of a variation of the use of the apparatus of FIG. 1.

In the drawings, and with particular reference to FIG. 1 thereof, there is shown a hollow container or vessel 10, the lower portion 12 of which is of rigid construction and relatively non-porous. The upper portion or platen 14 closes the vessel 10 and is also of relatively rigid construction but relatively porous. A connection 16 is provided to a suitable air exhaust pump (not shown) whereby the interior of the vessel 10 may be exhausted to create a vacuum or partial vacuum therein. Electrical heating means 18 attached to a suitable energy source (not shown) may be provided to heat the platen 14 and any materials in contact therewith to any desired elevated temperature. The positioning of the heating means should be such as not to interfere with the vacuum system. As shown in FIG. 1, the electrical heating means 18 is not in direct contact with the bottom surface of the platen 14. Such is not necessary and, if desired, the electrical heating means 18 may directly contact the bottom surface of the platen 14 whereby more efficient heat transfer is accomplished.

If desired or required, a connection 20 may also be provided to a suitable supply of steam (not shown) to heat the platen 14 and any materials in contact therewith, either in place of the electrical heating means or in addition thereto. However, if such steam heating is used, means must be provided to insure that the steam is admitted into the interior of the vessel 10 at a time when the vacuum is not in operation. The steaming cycle and the vacuum cycle may therefore be coordinated as required. That is, to say, for example, that the steam may be admitted at the end of the vacuum cycle and may continue to be admitted until the beginning of the next vacuum cycle, at which time the steam supply is ended. A flexible non-porous cover sheet 22 is provided and is of sufficient size and suitable drape as to be capable of conformably covering any materials placed on the platen 14.

The apparatus disclosed in FIG. 2 is basically similar to that illustrated in FIG. 1 and similar elements therein have similar reference numerals followed by the letter a. As illustrated therein, a hollow container or vessel 10a has a lower portion 12a which is of rigid construction and relatively non-porous. An upper portion or platen 14a closes the vessel 10a and is also of relatively rigid construction but is relatively porous. A connection 16a provides the necessary air-exhausting means to evacuate the air from the vessel 10a and to create a vacuum therein. The electrical heating means 18a however, is placed on top of the platen 14a and are covered by a protective press cladding 15a comprising cotton padding and a cloth cover. Again, if desired or required, a steam connection 20a is provided for auxiliary or substitute heating. A flexible non-porous cover sheet 22a is again used to cover the layers of textile fabrics being laminated.

In FIG. 3, there is illustrated a variation of the use of the apparatus of FIG. 1. A planar platen 14b is provided and is heated by strip heaters 18b, as described previously. A flexible non-porous cover sheet 22b is again provided but this time the materials to be laminated and bonded together comprise textile fabrics of different thicknesses and weights. The cover sheet 22b, however, is sufficiently flexible and possesses enough drape as to conform to the non-uniform irregular surface of the laminated fabrics. When the vacuum is created, the cover sheet 22b presses down uniformly with substantially equal pressure on all surfaces in contact therewith.

The pressure is applied to the material or materials by placing the material or materials on the platen and then covering the material on the platen with a flexible cover sheet which is impervious to air or which has low air porosity. When the pressure in the vessel is reduced the pressure of the atmosphere presses the materials against the platen. The flexible cover sheet ensures that the vacuum or partial vacuum is maintained and may have to withstand high temperatures and the following are some examples of materials suitable for this purpose. Sheets of polyethylene terephthalate, sheets of silicone rubber coated glass cloth, silicone rubber foam and P.T.F.E. coated fabrics. A polyethylene terephthalate sheet has the advantage that it may be transparent and the materials which are being treated by the apparatus may be observed to ensure correct positioning or heat sensitive pigments may be used on the materials to gain a knowledge of their temperature.

The area of material to be pressed should be smaller than the platen and the flexible cover sheet should be larger than the material and preferably for maximum efficiency but not necessarily cover all the holes in the platen or all the porous part of the platen.

By employing an inflatable diaphragm press a uniform or even pressure may be applied to materials of uniform or non-uniform thickness. However this vacuum press requires only a vacuum supply to apply pressure or raise the cover sheet whereas an inflatable diaphragm press requires compressed air to apply the pressure and vacuum to raise the diaphragm.

The apparatus has no moving parts in its simplest form but may be fitted with a conveyor system, and when using a transparent cover observation of the position of the materials and noting temperature by color change of heat sensitive pigments is possible.

When fusing in a rigid platen and inflatable diaphragm presses, moisture in the material to be fused is evaporated and is unable to escape which may prevent successful fusing. By the present method in a vacuum press such moisture is removed through the platen by the suction.

The method lends itself to an arrangement for fusing through the outer fabric so that the bonding resin is heated at the surface of the outer fabric and can therefore flow into the outer fabric. Also the non-resin side of the interlining material will be the coolest place in the laminate as it is against the flexible sheet which is exposed to the air. Thus, "strike-back" of the resin through the interlining is minimized. The method further provides a simple method of ironing or pressing garments or fabric, etc.

By the method of the invention, live steam may be applied to the press vacuum or partial vacuum or suction of air through the material may be applied, vacuum or partial vacuum with the flexible sheet in position provides a novel method of applying pressure for fusing and pressing. Heat may or may not be used in conjunction with the pressure. If a hot platen is used the pressure helps to conduct the heat to the materials by good thermal contact. The use of heat resistant flexible material for the flexible cover sheet enables the method to be employed with heat.

The method may also be employed for ironing or pressing garments and for automatic garment manufacture.

OUTER FABRIC OR FACING FABRIC

The outer fabric or facing fabric is normally selected to furnish the desired visual and tactile properties, especially softness and smooth hand or feel, although other characteristics and properties are frequently desired.

The outer fabric or facing fabric is normally woven, knitted, or nonwoven, although other types of fabrics are to be considered as applicable to the broader aspects of the present invention. Such other types of fabrics include, for example, felted fabrics, braided fabrics, lace, etc.

The weight of the facing fabric may be varied within relatively wide limits and may be as light as about 1 ounce per square yard up to as much as about 22 or more ounces per square yard. Preferably, however, the weight of the facing fabric 12 will be in the range of from about 4 ounces per square yard up to about 14 ounces per square yard.

The yarns used in the facing fabric are preferably natural fibers of animal origin such as wool, mohair, alpaca, etc. However, other fibers or filaments, either natural or man-made, may be used. Examples of such other fibers and filaments would include natural fibers such as cotton, silk, etc., or man-made fibers and filaments such as the acrylics (Acrilan, Creslon, Orlon), the modacrylics (Dynel), polyesters (Dacron, Kodel), rayon, cellulose acetate and triacetate, nylon 66, nylon 6, spandex (Lycra), polyolefins (Polypropylene, polyethylene), glass (Fiberglas), etc. Blends of the above fibers in various proportions are included.

FUSIBLE INTERLINING OR BACKING FABRIC

The fusible interlining or backing fabric is normally woven, knitted, or nonwoven, although other types of fabrics are to be considered as applicable to the broader aspects of the present invention. Such other types of fabrics include, for example, felted fabrics, braided fabrics, lace, needle-punched and stitch-bonded Arachne and Malimo fabrics, etc.

The yarns used in the fusible backing fabric are preferably natural or synthetic cellulosic yarns, primarily cotton or rayon. Other natural or synthetic yarns, however, may be used where their particular properties and characteristics may be of use. Such other yarns would include other natural fibers such as wool, silk, hair, and other man-made fibers such as acrylics (Acrilan, Creslan, Orlon), modacrylics (Dynel), polyesters (Dacron, Kodel), cellulose acetate and triacetate, nylon 66, nylon 6, spandex (Lycra), polyolefins (polypropylene, polyethylene), glass (Fiberglas), etc. Blends of the above fibers are included.

The weight of the backing fabric may be varied within relatively wide limits and may be as low as about ½ ounce per square yard and may be as high as about 20 ounces per square yard. Preferably, however, the backing fabric is in the range of from about 1 ounce per square yard to about 12 ounces per square yard.

ADHESIVE SYSTEM

The facing fabric and the fusible backing fabric may be adhered together by thermoplastic, heat-activatable discrete granules or other small particles, for example, of polyethylene which may be deposited in dry, tacky or molten fashion on the backing fabric in a random but substantially uniform, discontinuous, intermittantly spaced deposition. The specific methods of applying the granules or particles of the thermoplastic heat-activatable materials are not critical and substantially any known process of uniform distribution may be employed whereby the granules or particles are deposited in discontinuous intermittantly spaced fashion. For example, the granules may be sifted through screens having openings of a desired size, such as slightly greater than the largest granules present. Or, if desired, the granules may be deposited from a "salt shaker" form of apparatus whereby the backing fabric material passes under a vibrating container having openings in the bottom thereof to permit the granules to pass there through and to fall upon the backing fabric passing thereunder. After the granules have been deposited on the fabric, passage through a heated oven takes place to soften the granules and to cause them to adhere to the fabric.

Typical apparatus and processes for carrying out the application of granules and the subsequent heating thereof are noted in U.S. Pat. Nos. 2,603,575, 2,732,324 and 2,992,149. It is to be appreciated, however, that other apparatus and other methods may be employed to carry out such functions.

The granules may thus be temporarily heated, if necessary, to a high enough temperature for a sufficiently long enough time to soften them whereby they adhere to the backing fabric. If desired, pressure may be applied to press the granules or other particles into the backing fabric to insure good adherence thereto.

The backing fabric and the facing fabric are then brought together with the potentially adhesive material in the middle with heat and pressure being applied for a sufficiently long enough time to activate and soften the potentially adhesive material to bond the two fabrics together.

The amount of adhesive add-on will vary according to the type of fabrics involved, their weights, etc. For the purposes of this invention, it has been found that from about 10 grams (154 grains) to about 70 grams (1,078 grains) per square yard of fabric is generally employed. Preferably, within the more commercial aspects, from about 15 grams (231 grains) to about 60 grams (924 grains) per square yard of fabric is found most useful.

Many different adhesive materials may be used to bond the backing fabric and facing fabric. Granular polyethylene, polyvinyl acetate, and polyamides have been found to be very satisfactory for most applications. Other thermoplastic, heat-activatable materials, or other materials having inherently tacky and adhesive properties may be used. Among such other adhesive materials are included cellulose acetate, polypropylene, polyvinyl acetate, acrylics, polyesters, polyurethanes, etc. Homopolymers and copolymers of these are also of use. Natural adhesives are also of utility.

Granular polyethylene is one of the preferred forms of thermoplastic, heat-activatable materials. The low density type (0.910-0.925 g./cc.), or the medium density type (0.926-0.940 g./cc.), or the high density type (0.941-0.965 g./cc.) may be used depending on the needs and requirements of the particular situation. The density range of 0.91 to 0.93 g/cc. is normally preferable for granular polyethylene.

The above mentioned synthetic resins and particularly the polyamide resins may be used with or without added plasticizers.

Granular polyamides are another of the preferred forms of thermoplastic, heat-activatable materials. Specific forms of polyamides which may be used include nylon 6/6, nylon 6, nylon 10, nylon 11, nylon 12, and copolymers thereof.

The temperatures, pressures, times and duration of heat application of the thermoplastic adhesive material are all interrelated as is well known in the laminating art. The temperatures should, of course, be kept as low as possible, providing sufficient bonding temperatures are obtained, to avoid damaging or scorching the fabrics being bonded. Normally, adhesive-line temperatures ranging from as low as 200° F. up to about 350° F. are employed, although for some adhesives and for some fabrics, temperatures ranges of from about 190° F. up to 500° F. are possible.

It is not essential that a dry deposition of discrete granules in random but generally uniform fashion be used. Globules, or other small liquid masses, of soft, tacky adhesive materials may be printed on the backing fabric in any desired discontinuous, intermittantly spaced predetermined pattern to be immediately adhered thereto, whereby the temporary heating step may be omitted. One example of such would be a deposition of a vinyl chloride plastisol in a predetermined intermittantly-spaced, "dot" pattern. Subsequent positioning together of the facing fabric and the backing fabric, plus the application of heat and pressure, will then bond the two fabrics together. A liquid adhesive may also be deposited in an intermittantly spaced, predetermined pattern on the backing fabric and may have such a nature that it will remain wet and tacky sufficiently long enough so that the facing fabric may be applied thereto and adherence accomplished merely by the application of sufficient heat and/or pressure.

For example, an acrylic adhesive in a thickened, aqueous system may be printed on either the backing fabric or the facing fabric which was then combined and dried under sufficient pressure and heat to set the adhesive bond. Curing then is usually employed to improve dry cleanability and launderability. Although the binder is preferably applied in the form of discontinuous, discrete binder particles or segments, the application of a continuous overall binder, such as in film form, is also of use.

VACUUM SYSTEM

The amount of vacuum which is developed within the vessel may be varied widely and will depend upon the needs and requirements of the particular situation and more specifically upon the type, nature and weight of the fabrics being adhered and degree of adherence involved. For light fabrics which are to be pressed together with a minimum of applied pressure, the vacuum may be very small and merely a fraction of an inch of mercury, whereby the applied pressure is less than about 0.1 pound per square inch. For heavier fabrics which are to be pressed together with considerably greater force, then the vacuum may be increased to a much larger value and may even approach pressures up to as high as about 14 pounds per square inch. Such, however, is very unusual and normally not a commercial range. Within the more commercial aspects of the present invention, however, pressures in the range of from about 0.5 pounds per square inch to about 7 pounds per square inch are contemplated. The preferred range for the majority of textile fabrics is from about 1 pound per square inch to about 5 pounds per square inch.

The invention will be further described by reference to the following examples wherein there are disclosed preferred embodiments of the present invention. However, it is to be appreciated that such examples are illustrative and not limitative of the broader aspects of the inventive concept

EXAMPLE I

The following fusing techniques are used to bond together a facing fabric and a fusible backing fabric.

The outer or facing fabric is an 88 × 80 combed lawn fabric having a weight of about 1.83 oz. per square yard. The fusible interlining or backing fabric is a sintered fusible fabric comprising a black flannel base (2.64 oz. per square yard) and granular low density polyethylene (0.912 grams per cc.) deposited in an amount equivalent to 30 grams per square yard.

a. Regular conventional fusing techniques are used with the heat coming from the electrically heated movable head of the fusing press and passing through the fusible backing fabric and the granular polyethylene which is in contact with the facing fabric which is positioned on the buck. The pressure which is applied results from the closure of the movable heated head onto the stationary buck. The fusing conditions are as follows: 300° F. head temperature yielding a maximum adhesive glue line temperature of 258° F.; 8 seconds press closure time and squeezing time cycle-40 p.s.i. gauge pressure on the press head which is equivalent to 2.1 pounds per square inch pressure on the fabrics on the buck. The following properties are obtained:

| | |
|---|---|
| Peel strength, oz./inch | 42.1 |
| Dry cleanability, 5 cycles | 3 |
| Washingability | 4 |
| Softness | 3 |
| Strike-back of adhesive | 3 |

The last four properties are expressed in terms of a relative scale wherein 5 is excellent and 1 is poor.

b. The suction or negative pressure techniques of the present invention are used wherein the flat stationary platen or buck of an "Appar-all" press is modified and fitted with small strip heaters between the metal plate and the press cladding (cotton padding and cloth cover). This fitting is so arranged that it does not interfere with the perforations in the buck plate which enables the application of the vacuum. The flexible substantially non-porous, impervious cover sheet is made of a silicone rubber-coated glass fabric and is placed over the fusible backing fabric which is on top of the facing fabric in order to develop the requisite vacuum and thus provide the necessary pressure. Thus, the heat flows from the strip heating elements in the stationary buck (supplemented by the steam heated reservoir in the buck) through the facing fabric to the adhesive glue line formed by the granular polyethylene. Pressure on the facing fabric and the fusible backing fabric is obtained by the squeezing force exerted by atmospheric pressure on the impervious silicone rubber-coated glass fabric cover during the vacuum cycle. The operating conditions are as follows: A 3 inch mercury drop provides a pressure of about 1.47 pounds per square inch on the laminate. The adhesive glue line temperature is 260° F., and the press-squeezing time cycle is 8 seconds.

The following properties are obtained:

| | |
|---|---|
| Peel strength, oz./inch | 43.8 |
| Dry cleanability, 5 cycles | 3 |
| Washingability | 4 |
| Softness | 3 |
| Strike-back of adhesive | 4 |

It is to be observed that the use of vacuum techniques results in improved peel strength which is very desirable, and also in less strike back of the adhesive into the fusible backing fabric, which is also desirable, and is due to the application of a more uniform pressure and a lower overall pressure.

EXAMPLE II

The procedures of Example I are followed substantially as set forth with all materials and operating conditions similar except as specifically noted herein:

The outer or facing fabric is a woolen suiting fabric (6.18 oz. per square yard). The fusible interlining or backing fabric is a 64 × 56 print cloth (2.52 oz. per square yard) upon which are deposited thermoplastic, heat-activatable dots of a polyvinyl chloride plastisol (48 grams per square yard).

a. Using the regular conventional fusing techniques, the head temperature is 325° F. which yields a 280° F. maximum adhesive glue line temperature. There is a 15 seconds time cycle.

b. Using the vacuum techniques of the present invention, the adhesive glue line is 278° F., the vacuum is 3 inches of mercury yielding a pressure on the laminate of 1.47 pounds per square inch, and the press-squeezing cycle is increased to 18 seconds.

The following results are obtained:

|  | Regular Fusing | Vacuum Fusing |
| --- | --- | --- |
| Peel strength, oz./inch | 50.8 | 53.7 |
| Dry cleanability, 5 cycles | 5 | 5 |
| Softness | 5 | 5 |
| Strike-back of adhesive | 4 | 5 |

Again, the use of vacuum fusing techniques lead to improved results in peel strength and less strike-back of the adhesive into the fusible backing fabric.

EXAMPLE III

The procedures of Example I are followed substantially as set forth therein except that different vacuum conditions of 1, 2 and 5 inches of mercury are used, yielding pressures, respectively, of 0.5, 1 and 2.5 pounds per square inch on the laminated structures. The results are comparable and the bonding is satisfactory.

EXAMPLE IV

The procedures of Example I are followed substantially as set forth therein except that the textile fabrics have different thicknesses. See FIG. 3 wherein one thickness is approximately double the adjacent thickness of laminated fabrics.

The surface of the laminated structure which is presented to the flexible non-porous cover sheet is irregular, non-uniform and non-planar.

a. Use of regular conventional fusing techniques involving the application of a positive planar pressure does not work satisfactorily and the thinner portions of the laminated fabric are not adhered satisfactorily. The thicker portions appear over-pressed and crushed.

b. Use of the vacuum fusing techniques of the present invention permits the flexible cover sheet to adjust to the irregularities and non-uniformities which are present due to the different thicknesses of the textile fabrics as well as any irregularities or unevenness which is present in the buck. Commercially satisfactory fusing is attained over the entire area of the laminated fabrics.

Although the invention has been described by reference to the preceding specific examples, such as illustrative and not limitative. The broader aspects of the inventive concept are not to be limited thereby, except as defined by the appended claims.

What is claimed:

1. A method of adhering an outer facing fabric to a fusible interlining backing fabric which comprises: placing the outer facing fabric on a vessel having a porous surface; placing a fusible interlining backing fabric having a surface provided with thermoplastic, heat-activatable materials on said outer facing fabric with the thermoplastic, heat-activatable materials in contact with said outer facing fabric; covering the porous surface of said vessel and said backing fabric and said facing fabric thereon with a flexible, substantially non-porous cover sheet of sufficient size and suitable drape as to be capable of conformably covering said outer facing fabric and said fusible interlining backing fabric on the porous surface of said vessel; developing a vacuum in said vessel under said porous surface to apply suction to the non-porous cover sheet whereby said backing fabric and facing fabric are pressed together with a substantially uniform pressure over their entire contacting surfaces; and applying heat to said backing fabric and facing fabric to activate said thermoplastic materials to adhere said backing fabric to said facing fabric.

2. A method as defined in claim 1 wherein the outer facing fabric has an irregular, non-planar of non-uniform surface and the substantially non-porous cover sheet is sufficiently flexible and possesses sufficient size and suitable drape as to conform thereto, whereby the outer facing fabric and the fusible interlining backing fabric are pressed together with a substantially uniform pressure over their entire contacting surfaces.

3. A method as defined in claim 1 wherein the flexible, substantially non-porous cover sheet is a silicone rubber-coated glass fabric.

4. A method as defined in claim 1 wherein the outer facing fabric and the fusible interlining backing fabric have different thicknesses.

5. Apparatus for adhering an outer facing fabric to a fusible interlining backing fabric which comprises: a vessel having a porous surface upon which an outer facing fabric and a fusible interlining backing fabric may be placed; a flexible, substantially non-porous cover sheet of sufficient size and suitable drape as to be adapted to be placed on and conformably cover the porous surface of said vessel and the backing fabric and facing fabric thereon; means to develop a vacuum in said vessel under said porous surface to apply suction to the non-porous sheet whereby the backing sheet and facing sheet are pressed together with a substantially uniform pressure over their entire contacting surfaces; and means to apply heat to the backing fabric and facing sheet while they are so pressed together to adhere them to each other.

* * * * *